United States Patent [19]

Hoel

[11] Patent Number: 4,871,705
[45] Date of Patent: Oct. 3, 1989

[54] PROCESS FOR PRODUCTION OF A HIGH MOLECULAR WEIGHT ETHYLENE A-OLEFIN ELASTOMER WITH A METALLOCENE ALUMOXANE CATALYST

[75] Inventor: Elvin L. Hoel, Westfield, N.J.

[73] Assignee: Exxon Chemical Patents Inc., Linden, N.J.

[21] Appl. No.: 207,819

[22] Filed: Jun. 16, 1988

[51] Int. Cl.$^4$ ............................................. C08F 4/64
[52] U.S. Cl. .................................. 502/117; 502/108; 526/129
[58] Field of Search ............................... 502/108, 117

[56] References Cited

U.S. PATENT DOCUMENTS 4,295,991 10/1981 Wristers .......................... 502/108 X
4,658,078 4/1987 Slaugh et al. .................... 502/117 X
4,701,432 10/1987 Welborn .......................... 502/117 X

FOREIGN PATENT DOCUMENTS 0206794 12/1986 European Pat. Off. .

*Primary Examiner*—Patrick P. Garvin
*Attorney, Agent, or Firm*—M. B. Kurtzman

[57] ABSTRACT

Disclosed is a process for preparing high molecular weight ethylene-α-olefin elastomers, preferably an ethylene-propylene elastomer, by liquid phase polymerization of the requisite monomers in the presence of a metallocene/alumoxane catalyst system. Preferably, the process is carried out as a slurry polymerization utilizing the metallocene/alumoxane catalyst in supported form on a silica gel support with the α-olefin monomer maintained in liquid state and used in excess to serve as a polymerization diluent. The metallocene component of the catalyst by which the process is practiced is of the formula:

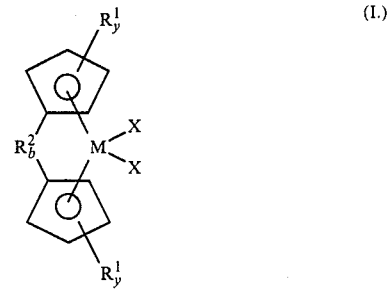

(I.)

wherein M is zirconium, titanium or hafnium; each $R^1$ independently is a $C_1$–$C_{20}$ linear, branched or cyclic alkyl group or a $C_2$–$C_4$ cyclic alkylene group which forms a fused ring system group; $R^2$ is a $C_1$–$C_6$ linear, branched or cyclic alkylene, a $Si_1$–$Si_2$ alkyl substituted silanylene group or an alkyl substituted silaalkylene group; each X independently is an alkyl, aryl, halide, hydride or oxygen bridge of a zirconocene dimer; "y" is a number 2, 3 or 4, and "b" is a number 0 or 1. M is preferably zirconium. Most preferably, the supported zirconocene/alumoxane catalyst is prepolymerized with ethylene or another olefin to provide spherical, free-flowing catalyst particles which give free-flowing particulate elastomer product from the slurry polymerization.

9 Claims, No Drawings

PROCESS FOR PRODUCTION OF A HIGH MOLECULAR WEIGHT ETHYLENE A-OLEFIN ELASTOMER WITH A METALLOCENE ALUMOXANE CATALYST

FIELD OF THE INVENTION

This invention relates to a process for preparing high molecular weight ethylene-α-olefin elastomers, preferably an ethylene-propylene elastomer, by liquid phase polymerization of the requisite monomers in the presence of a zirconium, titanium, or hafnium metallocene/alumoxane catalyst system. Preferably, the process is carried out as a slurry polymerization utilizing a zirconocene/alumoxane catalyst in supported form on a silica gel support with the α-olefin monomer maintained in liquid state and used in excess to serve as a polymerization diluent. Most preferably, the supported zirconocene/alumoxane catalyst is prepolymerized with ethylene or another olefin to provide spherical, free-flowing catalyst particles which give free-flowing particulate elastomer product from the slurry polymerization.

BACKGROUND OF THE INVENTION

As is well known to those skilled in the art, various processes and catalysts exist for the homopolymerization or copolymerization of α-olefins. For example, processes are known for polymerizing ethylene or propylene, either alone or in the presence of small quantities of other monomers, to produce plastics. These plastics are typically used in such applications as blow and injection molding, extrusion coating, film and sheeting, pipe, wire and cable. Also for example, it is well known to copolymerize ethylene, propylene, and optionally a third monomer such as non-conjugated dienes, to make elastomers. Ethylene-propylene elastomers find many end-use applications due to their resistance to weather, good heat aging properties and their ability to be compounded with large quantities of fillers and plasticizers. Typical automotive uses are radiator and heater hose, vacuum tubing, weather stripping and sponge doorseals. Typical industrial uses are for sponge parts, gaskets and seals.

Due to their different properties and end uses, it is important to distinguish between those factors affecting elastomeric or plastic properties of o-olefin polymers. While such factors are many and complex, a major one of instant concern is that related to sequence distribution of the monomers throughout the polymer chain.

For polyolefin plastics, sequence distribution is of little consequence in determining polymer properties since primarily one monomer is present in the chain. Accordingly, in plastic copolymers the majority monomer will be present in the form of long monomeric blocks.

While sequence distribution is thus of little concern with respect to polymeric plastics, it is a critical factor to be considered with respect to elastomers. If the olefinic monomers tend to form long blocks which can crystallize, elastic properties of the polymer are poorer than in a polymer with short monomer sequences in the chain.

For example, titanium catalysts which can produce stereoregular propylene sequences are particularly disadvantageous since creating blocks of either ethylene or propylene will lead to undesirable levels of crystallinity in an elastomer.

At a given comonomer composition, sequence distribution is primarily a function of the catalyst components chosen. It can thus be seen that the artisan must exercise extreme care in selecting a catalyst system for making elastomers, with their critical dependency on sequence distribution. It can also be seen that, on the other hand, no such restrictions apply to the selection of a catalyst system for making plastic polymer.

To avoid crystallinity in copolymers, it is also necessary to use a catalyst that produces a material with a narrow compositional distribution so that fractions containing a high content of one monomer are not present.

Furthermore, when making ethylene-α-olefin copolymers it is well known that the α-olefin may act as a chain transfer agent. For essentially crystalline copolymers with low o-olefin content, the molecular weight modifying effect of the α-olefin may be insignificant. However, when making copolymers with compositions in the elastomer range, catalysts that give high molecular weight plastic copolymers may produce low molecular weight polymers unsuitable for elastomer applications. In a similar fashion, undesirable molecular weight distribution changes can occur or the compositional distribution can change.

In view of the complicated and poorly understood relationship beteween polymer composition and catalyst performance, it is difficult for the artisan to predict the behavior of a catalyst for the production of an elastomer if it has only been used previously to make plastic homo- or copolymers.

European Patent Application No. 206,794 discloses that certain supported metallocene/alumoxane systems, particularly bis(cyclopentadienyl) transition metal metallocenes, in which the cyclopentadienyl ligands are unsubstituted or substituted and may be bridged by an alkylene or a silanylene group, are useful for polymerizing ethylene to a homopolymer or to a copolymer with an α-olefin for purposes of modifying the clarity or impact properties of the polyethylene polymer product.

The art has also indicated that amorphous ethylene-propylene copolymers may be produced by metallocene/alumoxane catalyst systems in which the metallocene component is a particular species of metallocene. As used in the art the term "EPC" means a copolymer of ethylene and an α-olefin which exhibits the properties of an elastomer as defined in ASTM D1566 under rubber. However, as heretofore reported, the EPC's so produced have been too low in molecular weight to be suitable for use as a commercial elastomeric material, especially when the elastomer has more than 20 wt. % incorporated propylene. Also, the activities of the catalysts employed have been too low for production of products with low residues of catalyst in a reasonable time.

In European Patent Application No. 128,046 it is indicated that an alumoxane system with dimethylsilanylenedicyclopentadienyl zirconium dichloride or bis(cyclopentadienyl) titanium diphenyl will catalyze production of a low molecular weight EPC, and that such Catalyst systems may be employed in conjunction with other distinct metallocene/alumoxane catalyst systems to produce reactor blends of an EPC with high density polyethylene (HDPE) and linear low density polyethylene (LLDPE) such as, HDPE/EPC, LLDPE/EPC, HDPE/LLDPE/EPC reactor blends or the like. The EPC component of the blends so produced—which by itself by reason of its low molecular weight is not a commercially useful elastomer -is useful in the context of a modifier blend component for the base HDPE or LLDPE with which it is coproduced.

Japanese Kokai numbers 119,215; 121,707; and 121,709 disclose production of soft copolymers variously of ethylene-α-olefin, propylene-α-olefin, butylene-α-olefin, using a metallocene/alumoxane catalyst system wherein the metallocene is a metal salt of a lower alkylene bridged -bis(cyclopentadienyl), -bis(indenyl) or -bis(tetrahydroindenyl) compound. The Japanese Kokai represent that copolymer products may be produced by a gas or liquid phase reaction procedure to have a wide range of properties such as crystallinities from 0.5-60%, while having a molecular weight distribution (MWD) less than 3 with low levels of boiling methyl acetate soluble components. The Japanese Kokai represent that such copolymerization may be carried out in the presence of such catalysts at temperatures from $-80°$ to $50°$ C. under pressures ranging from ambient to 30 kg/cm$^2$. Yet in the examples of the first two Japanese Kokai, which illustrate actual production of such materials, the reaction conditions illustrated are temperatures of $-10$ to $-20°$ C. at reaction times of from 5 to 30 hours using solution polymerization with toluene as the solvent. A process as illustrated by the operating examples of the first two Japanese Kokai is not attractive from a standpoint of commercial production since the long reaction times, low temperatures and need to separate polymer product from the reaction solvent impose severe increases in production cost of the resulting copolymer material. The process of Japanese Kokai 121,709 is also unattractive for commercial production due to the use of toluene as a solvent and the expense of separating and recycling the large volume of solvent.

A process by which EPC elastomers of commercially acceptable properties may be produced within a range of reaction conditions which are suitable for commercial practice, using metallocene/alumoxane catalyst systems, has not been demonstrated. For an EPC elastomer to be considered to have commercially acceptable properties, it should have a Mooney viscosity (ML$_{1+8}$ at 127° C.) no less than 10, a weight-average molecular weight no less than 110,000, a glass transition temperature below $-40°$ C. and a degree of crystallinity no greater than 25%. For certain applications, e.g. extrusion performance, EPC elastomers should also have a molecular weight distribution characterized by the ratio of weight-average to number-average molecular weights of 5 or less. The range of reaction conditions most economical, hence commercially viable for practice, under which EPC elastomers should be produced is a reaction temperature ranging from 0° to 80° C. at reaction residence times of less than 6 hours. Desirably, the reaction conditions should minimize or eliminate the number of extrinsic treatment steps needed to isolate the polymer product in final marketable form. Hence, it is desirable for the production method to employ as a reaction diluent one or more of the monomers rather than an inert solvent from which the polymer product must later be separated. It is also desirable that the product be produced in the form of granules suspended in the reaction medium for ease of isolation and subsequent processing. Finally, it is desirable that the catalyst be sufficiently active that removal of catalyst residue (deashing) from the product is not needed.

SUMMARY OF THE INVENTION

The invention comprises a process employing a metallocene/alumoxane catalyst system in which the metallocene is a specific class of zirconocene, titanocene or hafnocene which provides for the production of high molecular weight ethylene-α-olefin elastomers under reaction conditions suitable for commercial practice. Employment of one of the specified metallocenes, preferably a zirconocene, in the metallocene/alumoxane catalyst in a slurry reaction process results in the production of high molecular weight ethylene-α-olefin elastomers which typically have a low ash content (where ash refers to the catalyst and cocatalyst residue in the polymer), so that deashing is not required.

The metallocene component of the metallocene/alumoxane catalyst system employed in the practice of the process of this invention is of the following formula:

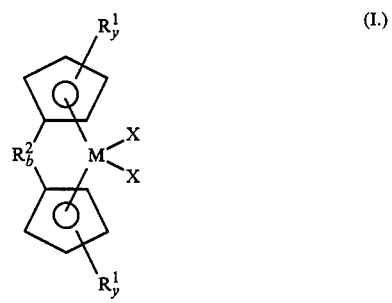

(I.)

wherein M is zirconium, titanium or hafnium; each R$^1$ independently is a C$_1$-C$_{20}$ linear, branched or cyclic alkyl group or a C$_2$-C$_{20}$ cyclic alkylene group which forms a fused ring system; R$^2$ is a C$_1$-C$_6$ linear, branched or cyclic alkylene, a Si$_1$-Si$_2$ alkyl substituted silanylene group or an alkyl substituted silaalkylene group; each X independently is a halide, hydride, oxygen bridge of a metallocene dimer, or a hydrocarbyl radical such as an aryl group or a linear, branched or cyclic alkyl group; "y" is a number 2, 3 or 4, and "b" is a number 0 or 1. Preferably M is zirconium. Typically the X hydrocarbyl group may have from 1 to 20 carbon atoms, but may be greater if desired.

A preferred catalyst system is of the following formula:

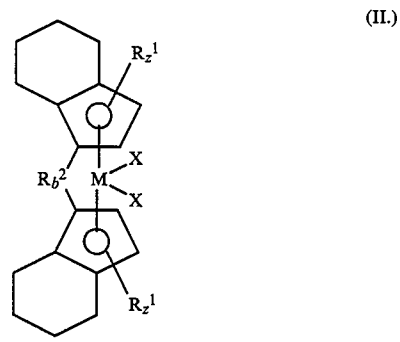

(II.)

wherein M, X, R$^1$, R$^2$, and "b" are as previously defined and "z" is a number 0, 1 or 2. The most preferred catalysts are those of formula II wherein M is zirconium, "b" is 1 and R$^2$ is an alkyl substituted silanylene group.

Utilizing the defined metallocene in the metallocene/alumoxane catalyst with which the process is practiced, the process may be practiced with the catalyst in non-supported form by adding the metallocene and alumoxane in hydrocarbon solutions to the polymerization diluent. Preferably, the metallocene/alumoxane catalyst system is used in a heterogeneous form on a catalyst support, such as a silica gel support, and polymerization is carried out by a slurry polymerization technique in which an α-olefin monomer suitable for use as a polymerization diluent is used in excess and maintained in the liquid state. By "slurry" polymerization it is meant that the product polymer is produced in the form of granules suspended in the polymerization diluent. More preferably, the supported metallocene/alumoxane catalyst is prepolymerized with ethylene or an α-olefin to control EPC granule size and size distribution for the direct production of granular EPC products from the slurry process.

DESCRIPTION OF THE PREFERRED EMBODIMENTS

This invention relates to a process for producing in high yield ethylene-α-olefin elastomers of high molecular weight, low crystallinity, and low ash. In particular, it relates to a catalyst system comprising metallocene/alumoxane systems which are highly active for the production of high molecular weight ethylene-α-olefin elastomers in a slurry polymerization process.

As used herein the term "EPC" means a copolymer of ethylene and an α-olefin which exhibits the properties of an elastomer. The α-olefins suitable for use in the preparation of elastomers with ethylene are preferably $C_3$–$C_{16}$ α-olefins. Illustrative non-limiting examples of such α-olefins are propylene, 1-butene, 1-pentene, 1-hexene, 1-octene and 1-dodecene. If desired, more than one α-olefin may be incorporated.

The EPC elastomers may contain about 20 up to about 90 weight percent ethylene, more preferably about 30 to 85 weight percent ethylene, and most preferably about 35 to about 80 weight percent ethylene.

The catalyst employed in the method of this invention is a metallocene/alumoxane system wherein the metallocene component of the catalyst system is of the formula:

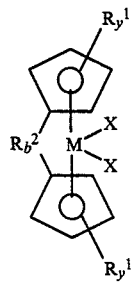

wherein M is zirconium, titanium or hafnium; the $R^2$ bridging group, if present, is a linear, branched or cyclic alkylene group having from one to six carbon atoms, an alkyl substituted silaalkylene group having from one to two silicon atoms in place of carbon atoms in the bridge, or a $Si_1$–$Si_2$ alkyl substituted silanylene group; each $R^1$ independently is a linear or branched hydrocarbyl radical having from one to twenty carbon atoms or a cyclic hydrocarbylene di-radical having carbon atoms joined to different ring positions of the cyclopentadienyl group to form a $C_4$–$C_6$ fused ring system; each X independently is a hydride, halide, oxygen bridge of a metallocene dimer, or a hydrocarbyl radical such as an aryl group or a linear, branched or cyclic alkyl group; "y" is a number from 2 to 4 and "b" is a number 0 or 1. The metallocene is preferably a zirconocene, that is M is zirconium. Exemplary $R^1$ hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary $R^1$ hydrocarbylene di-radicals are ethylene, propylene, butylene or the like. Preferably the $R^1$ group is a cyclic hydrocarbylene of butylene which is joined to adjacent ring positions of the cyclopentadiene to provide a tetrahydroindenyl fused ring structure. Hence, in the preferred case the metallocene component of the catalyst system is a zirconocene of the formula:

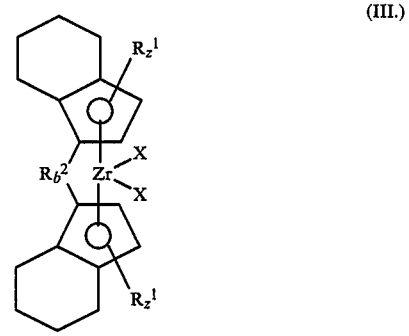

wherein $R^1$ is a linear or branched hydrocarbyl radical having from 1 to 20 carbon atoms; "z" is an integer number from 0 to 2; and $R^2$ X and "b" are as previously described. Exemplary $R^2$ linear alkylene radicals are methylene, ethylene, propylene, butylene, pentylene, hexylene and the like. Exemplary $R^2$ cyclic alkylene diradicals are cyclobutylene, cyclopentylene, cyclohexylene and the like. Exemplary $R^2$ alkyl substituted silanylene groups are dimethylsilanylene, methylethyl silanylene, diethylsilanylene, tetramethyldisilanylene, tetraethyldisilanylene, and the like. The $R^2$ group may also be an alkyl substituted silaalkylene group, i.e. a bridge composed of a carbon-silicon sequence, e.g. —Si(R'-)$_2$—C(R")$_2$—wherein R' is lower alkyl and R" is hydrogen or lower alkyl. Exemplary $R^2$ alkyl substituted silaalkylene groups are 1-sila-1,1-dimethylethylene, 2-sila-2,2-dimethylpropylene, 1,3-disila-1,1,3,3-tetramethyl propylene and the like. Preferably $R^2$ is ethylene, dimethylsilanylene or "b" is 0 and $R^2$ is absent, most preferably $R^2$ is dimethylsilanylene.

The preferred zirconocenes contain bis(tetrahydroindenyl), ethylene-bis(tetrahydroindenyl) and dimethylsilanylene-bis(tetrahydroindenyl) ligands, with dimethylsilanylene-bis(tetrahydroindenyl) zirconocenes the most preferred. Exemplary of suitable zirconocenes are bis(tetrahydroindenyl) zirconium dichloride, ethylene bridged bis(tetrahydroindenyl) zirconium dichloride, and dimethylsilanylene bridged bis(tetrahydroindenyl) zirconium dichloride.

Methods for preparing the required metallocene component are known in the art, for example see H. H. Brintzinger, et al.; *Journal of Organometallic Chemistry*, Vol. 288, p. 63 (1985); C. S. Bajgur, W. R. Tikkanen, J. L. Petersen; *Inorg. Chem.*, Vol. 24, pp. 2539–2546 (1985).

The alumoxane component of the catalyst system is an oligomeric aluminum compound represented by the general formula $(R—Al—O)_n$, which is a cyclic compound, or $R(R—Al—O—)_nAlR^2$, which is a linear compound. In the general alumoxane formula R is a $C_1$-$C_5$ alkyl radical, for example, methyl, ethyl, propyl, butyl or pentyl and "n" is an integer from 1 to about 50. Most preferably, R is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

The catalyst employed in the method of the invention is formed upon admixture of a metallocene, preferably a zirconocene, as specified, with an alumoxane. The catalyst system may be prepared as a non-supported catalyst by mixing the requisite metallocene and alumoxane in a suitable diluent either in the presence or absence of monomers. The polymerization employing non-supported catalysts can be carried out either by solution or slurry polymerization procedures. In the context of the present invention the catalyst system is preferably prepared and employed as a heterogeneous catalyst by adsorbing the requisite metallocene and alumoxane components on a catalyst support material such as silica gel, alumina or other suitable inorganic support material.

The heterogeneous form of catalyst system is particularly suitable for a slurry polymerization procedure. For the production of EPC elastomers in accordance with the method of this invention, it is preferred to utilize the α-olefin monomers in liquified state as the polymerization diluent. As a practical limitation, slurry polymerization takes place in liquid diluents in which the polymer product is substantially insoluble. Preferably, the diluent for a slurry polymerization is one or more hydrocarbons with less than 5 carbon atoms. If desired, saturated hydrocarbons such as ethane, propane, or butane may be used in whole or part as the diluent. Likewise, the α-olefin monomer or a mixture of different α-olefin monomers may be used in whole or part as the diluent. Most preferably the diluent comprises in major part the α-olefin monomer or monomers to be polymerized.

The support material for preparing a heterogeneous catalyst may be any finely divided inorganic solid porous support, such as talc, silica, alumina, silica-alumina or mixtures thereof. Other inorganic oxides that may be employed either alone or in combination with silica or silica-alumina are magnesia, titania, zirconia, and the like. The inorganic oxides should be dehydrated, as is well known in the art, to remove water. If desired, the residual surface hydroxyl groups in the inorganic solid porous support may be removed by additional heating or by reaction with dehydroxylating agents such as lithium alkyls, silyl chlorides, aluminum alkyls, or preferably with alumoxane. A preferred catalyst support is a dehydrated inorganic oxide treated with an alumoxane, more preferably methylalumoxane. A suitable support material is a dehydrated silica gel treated with methylalumoxane.

The normally hydrocarbon soluble metallocene and alumoxane are prepared as a heterogeneous supported catalyst by deposition on a support material, such as a dehydrated silica gel treated with methylalumoxane. A suitable silica gel would have a particle diameter in the range 1-600 microns, preferably 10-100 microns; a surface area of 50-1000 $m^2/g$, preferably 100-500 $m^2/g$; and a pore volume of 0.5-3.5 $cm^3/g$. The silica gel may be heat treated at 100°-1000° C., preferably 300°-800° C. for a period of 1-100 hours, preferably 3-24 hours, to insure its use in dehydrated form.

The catalyst system obtained through contacting of the metallocene and the alumoxane cocatalyst may be formed prior to introduction of these components into the reactor, or, alternatively, it may be formed in the reactor. In the case wherein a zirconocene is employed and the active system is formed in the reactor, the mole ratio of Al to Zr in the reactor is desirably in the range 10-5000, preferably 20-4000 and most preferably 20-1000. In the case that the active system is formed outside the reactor, the preferred ratio of Al to Zr is in the range 1-200, desirably 20-200. In this case, additional alumoxane cocatalyst may be used in the reactor so that the total ratio of Al to Zr is in the range 10-5000, preferably 20-4000 and most preferably 20-1000. Likewise, in this case, a small amount of another alkylaluminum compound, such as triethylaluminum or trisobutylaluminum, may be added to the reactor together with, or instead of, additional alumoxane, for the purposes of scavenging any impurities which may be present in the reactor. In all of the above, the catalyst or cocatalyst may be contacted in the reactor with one of the components present on a suitable support, as described below.

As stated before, zirconocenes of the specified cases are the preferred metallocenes. Consequently further discussion of the catalyst will be with specific reference to zirconocenes although it should be understood that similar conditions and procedures are applicable to titanocenes and hafnocenes as well.

In the preferred case a dehydrated silica gel is contacted with alumoxane and subsequently with the zirconocene. If desired the zirconocene can be added to a dehydroxylated support material prior to contacting the support material with an alumoxane. In accordance with the preferred embodiment of this invention, the alumoxane dissolved in a suitable inert hydrocarbon solvent is added to the support material either dry or slurried in the same or other suitable hydrocarbon liquid and thereafter the zirconocene is added to the slurry, preferably after drying the support under vacuum and reslurrying in a light hydrocarbon. The zirconocene is added to the slurry in an amount sufficient to provide from about 0.02 to about 5.0 weight percent zirconium metal based on total catalyst weight. The zirconocene is more preferably added in an amount to provide from about 0.10 to about 1.0 weight percent zirconium metal based on total catalyst weight.

The treatment of the support material, as mentioned above, is conducted in an inert solvent. The same inert solvent or a different inert solvent is also employed to dissolve the zirconocene and alumoxanes. Preferred solvents include the various hydrocarbons which are liquid at treatment temperatures and pressures and in which the individual ingredients are soluble. Illustrative examples of useful solvents include the alkanes such as propane, butane, pentane, iso-pentane, hexanes, heptanes, octanes and nonanes; cycloalkanes such as cyclopentane and cyclohexane; and aromatics such as benzene, toluene, xylenes, ethylbenzene and diethylbenzene. Sufficient solvent should be employed so as to provide adequate heat transfer away from the catalyst components during reaction and to permit good mixing.

The temperature maintained during the contact of the reactants can vary widely, such as, for example, from 0° to 100° C. Greater or lesser temperatures can also be employed. The reaction between the alumoxane and the support material is rapid, however, it is desirable that the alumoxane be contacted with the support material for about one half hour up to eighteen hours or greater. Preferably, the reaction is maintained for about one hour at 25°–100° C.

At all times, the individual ingredients as well as the recovered catalyst components must be protected from oxygen and moisture. Therefore, the reactions are performed in an oxygen and moisture free atmosphere and the catalyst is recovered in an oxygen and moisture free atmosphere. Preferably, therefore, the reactions are performed in the presence of an inert dry gas such as, for example, nitrogen. The recovered solid catalyst is maintained in the inert gas atmosphere.

Upon completion of the deposition of the zirconocene and alumoxane on the support, the solid material can preferably be treated with a small amount of monomer, e.g. ethylene, to form an amount of polymer on the solid catalyst materials to increase the catalyst weight at least 50%, desirably from about 100 to about 500% based on the total weight of catalyst and support material. Such treatment is hereafter referred to as prepolymerization of the catalyst. Then the solid material, as such or as prepolymerized, can be recovered by any well-known technique. For example, the solid catalyst material can be recovered from the liquid by filtration, by vacuum evaporation, or by decantation. The solid is thereafter dried under a stream of pure dry nitrogen or dried under vacuum.

Prepolymerization of the solid catalyst material aids in obtaining an EPC elastomer produced therefrom during slurry polymerization in well-defined particle form. The prepolymerized catalyst may be rinsed with a hydrocarbon to provide the good granular particle form. Prepolymerization also greatly reduces the requirement for alumoxane. For example, an Al:Zr ratio of 1000:1 or greater for alumoxane:zirconocene is needed for high activity when the alumoxane is added to the liquid phase of the reactor, but a ratio less than 100:1 is sufficient when the alumoxane is incorporated into the prepolymerized catalyst. For a prepolymerized catalyst the ratio of aluminum to zirconium may range from about 1:1 to 500:1, preferably from about 20:1 to 100:1, and high activities will still be obtained.

Most preferably, the supported catalyst is prepared in the following manner 1) forming a slurry by the addition of the alumoxane dissolved in a suitable solvent, toluene for example, to the support; 2) stirring the slurry at 60–80° C. for 30–60 minutes; 3) removal of solvent under vacuum with heating sufficient to produce a dry powder; 4) adding a light hydrocarbon, pentane for example, to slurry the powder; 5) adding a solution of the zirconocene in pentane or a minimum amount of toluene and stirring for 15–60 minutes at 20–60° C.; 6) prepolymerizing with ethylene or other olefin in the pentane slurry and then collecting, rinsing and drying the catalyst. For best particle form, it is preferred to add no alumoxane to the reactor beyond what is on the prepolymerized catalyst. Sufficient aluminum alkyl, such as triethylaluminum or triisobutylaluminum, to scavenge impurities in the feeds may be added, but not an excess.

In accordance with the preferred procedure of this invention an EPC elastomer is produced by slurry polymerization utilizing the α-olefin monomer or mixture of monomers as the polymerization diluent in which a supported zirconocene/alumoxane catalyst system is suspended. Ethylene is added to the reaction vessel in an amount sufficient to produce the desired ethylene content in the EPC product. The differential pressure of ethylene, in excess of the vapor pressure of the α-olefin monomer, required to produce a given ethylene content depends on the structure of the zirconocene used. Generally the polymerization process is carried out at an ethylene differential pressure of from about 10 to about 1000 psi, most preferably from about 40 to about 600 psi; and the polymerization diluent is maintained at a temperature of from about -10 to about 100° C.; preferably from about 10 to about 70° C., and most preferably from about 20° to about 60° C. Under the conditions as above indicated the ethylene and α-olefin monomers copolymerize to an EPC elastomer.

The polymerization may be carried out as a batchwise slurry polymerization or as a continuous slurry polymerization. The procedure of continuous process slurry polymerization is preferred, in which event ethylene, liquid α-olefin, and catalyst are continuously supplied to the reaction zone in amounts equal to the EPC polymer, ethylene, α-olefin, ad catalyst removed from the reaction zone in the product stream.

Without limiting in any way the scope of the invention, one means for carrying out the process of the present invention is as follows: In a stirred-tank reactor liquid propylene monomer is introduced. Feed ethylene gas is introduced either into the vapor phase of the reactor, or sparged into the liquid phase as well known in the art. The reactor contains a liquid phase composed substantially of liquid propylene together with dissolved ethylene gas, and a vapor phase containing vapors of all monomers. Catalyst and cocatalyst (and/or scavenger aluminum alkyl) are introduced via nozzles in either the vapor or liquid phase. The reactor temperature and pressure may be controlled via reflux of vaporizing α-olefin monomer (autorefrigeration), as well as by cooling coils, jackets etc. The polymerization rate is controlled by the rate of catalyst addition, or by the concentration of cocatalyst manipulated separately. The ethylene content of the polymer product is determined by the zirconocene used and by the ratio of ethylene to propylene in the reactor, which is controlled by manipulating the relative feed rates of these components to the reactor.

As shown in Table I, for a given set of reaction conditions, zirconocenes with more open reaction sites incorporate propylene more easily than those with more hindered sites. Reaction sites become more open with shorter bridges between the cyclopentadienyl rings and more hindered by addition of bulkier substituents to the rings. To open the reaction site, even where a bulky substituent is carried y the cyclopentadienyl rings, it is preferred to employ a short bridge between the rings, such as a dimethylsilanylene bridge. However, for any zirconocene the incorporation can be varied by adjustment of the ethylene/propylene ratio in the reactor.

The polymer product molecular weight is controlled, optionally, by controlling other polymerization variables such as the temperature, or by a stream of hydrogen introduced to the gas phase of the reactor, as is well known in the art. The polymer product which leaves the reactor is recovered by flashing off gaseous ethylene and propylene at reduced pressure, and, if necessary, conducting further devolatilization in equipment such as a devolatilizing extruder. In a continuous process the residence time of the catalyst in the reactor generally is from about 20 minutes to 8 hours, preferably 30 minutes to 6 hours, and more preferably 30 minutes to 4 hours.

The final properties of the EPC elastomer produced by the process of the invention are related to the zirconocene structure and the reaction conditions, particularly the ethylene/propylene ratio and reaction temperature.

The various zirconocenes in Table I exhibit different activities for a given set of reaction conditions. Naturally, higher activity catalysts are preferred provided that the catalyst can produce the desired polymer properties. However, less active catalysts may be preferred for their specific incorporation characteristics. For instance, to reduce total reactor pressure while making high ethylene content EPC, an unbridged or long bridged zirconocene may be preferred. These catalysts are very long lived, so longer reaction times will result in a higher yield of an EPC elastomer for a given catalyst concentration, providing a product with low catalyst residues.

In the Examples which illustrate the practice of the invention the analytical techniques described below were employed for the analysis of the resulting EPC elastomer products. The Mooney viscosity, $ML_{1+8}$, 127° C., was measured in a Monsanto Mooney Viscometer according to ASTM D1646. Polymer ethylene content was determined by infrared analysis according to ASTM D3900. Molecular weight determinations for EPC elastomer products were made by gel permeation chromatography (GPC) according to the following technique. Molecular weights and molecular weight distributions were measured using a Waters 150 gel permeation chromatograph equipped with a differential refractive index (DRI) detector and a Chromatix KMX-6 on-line light scattering photometer. The system was used at 135° C. with 1,2,4-trichlorobenzene as the mobile phase. Shodex (Showa Denko America, Inc.) polystyrene gel columns 802, 803, 804 and 805 were used. This technique is discussed in "Liquid Chromatography of Polymers and Related Materials III", J. Cazes editor, Marcel Dekker, 1981, p. 207 which is incorporated herein by reference. No corrections for column spreading were employed; however, data on generally accepted standards, e.g. National Bureau of Standards Polyethlene 1484 and anionically produced hydrogenated polyisoprenes (an alternating ethylene-propylene copolymer) demonstrated that such corrections on Mw/Mn were less than 0.05 units. Mw/Mn was calculated from an elution time. The numerical analyses were performed using the commercially available Beckman/CIS customized LALLS software in conjunction with the standard Gel Permeation package, run on a Hewlett-Packard 1000 computer.

CATALYST PREPARATION EXAMPLES
Example 1

Synthesis of methylalumoxane/silica gel support [MAO/SiO$_2$]

In a dry box, 30 ml of a solution of methylalumoxane (MAO) in toluene (supplied by Ethyl Corporation under label identification as 1M in aluminum) was added to 15 g of Davison 955 silica gel which had been dried at 800° C. for 4 hours. The solvent was removed under vacuum.

Example 2

Silica supported bis(tetrahydroindenyl)zirconium dichloride catalyst

A MAO-treated silica gel was prepared in the same manner as in Example 1, except that 25 ml of MAO (Ethyl Corporation, 1 M in aluminum) was added instead of 30 ml. 5 g of the resulting MAO-treated silica gel was weighed into a 50 ml Schlenk flask equipped with a magnetic stir bar in a dry box. 250 mg of bis(tetrahydroindenyl)zirconium dichloride was added to 7 ml of toluene, and the toluene solution was added dropwise to the MAO-treated silica gel support with magnetic stirring over 30 minutes. The solid caked. After 5 minutes of homogenization using a stir bar, 6 ml of additional dry toluene was added to slurry the silica. The flask was removed from the dry box to a vacuum line and toluene was removed under vacuum. The dried solids nominally contain 4.8% by weight of the catalyst system or 1.1 wt. % Zr.

Example 3

Silica supported ethylene bridged bis(tetrahydroindenyl) zirconium dichloride catalyst.

In a dry box, 2.0 g of the MAO-treated silica gel support made in Example 1 was weighed into a 50 ml Schlenk flask equipped with a 1 inch magnetic stir bar. 50 mg of ethylene-bis(tetrahydroindenyl)zirconium dichloride was dissolved in 3 ml of toluene with the aid of a heat gun. After dissolution, the solution was added dropwise to the 2 g of MAO-treated silica gel and then 4 ml of additional dry toluene was added to convert the powder into a slurry. This was removed from the dry box and stirred at 55° C. in an oil bath for 30 minutes. The slurry was then evacuated on a Schlenk line. When completely dry, 1.834 g of solids were recovered with a nominal loading of 2.4 wt. % zirconocene or 0.52 wt. % Zr.

Example 4

Silica supported dimethylsilanylene-bis(tetrahydroindenyl) zirconium dichloride catalyst.

In a dry box, a solution of 50 mg of dimethylsilanylene bis(tetrahydroindenyl)zirconium dichloride in 3 ml of toluene was added dropwise to 2.0 g of the MAO-treated silica gel of Example 1 which was vigorously stirred with a magnetic stir bar. Another 4 ml of toluene was then added to slurry the solids. The slurry was stirred at 55° C. for 30 minutes and then the solvent was removed under vacuum. The catalyst is nominally 2.4 wt. % zirconocene or 0.49 wt. % Zr.

Example 5

Synthesis of Prepolymerized Catalyst For Run C3 of Example 9

To 5 g of Davison 948 silica gel (dried at 800° C. for 4 hours) in a 500 ml flask equipped with a magnetic stir bar, was added 85 ml of MAO in toluene (Ethyl Corporation, reported 1 M in aluminum). The toluene was removed under vacuum, with heating to 45° C. To 1.08 g of the solid residue (which had been rinsed with 10 ml, then 4 ml of dry pentane, filtering after each rinse), magnetically stirred in 25 ml of dry pentane, was added 11 mg of bis(tetrahydroindenyl)zirconium dichloride dissolved in 25 ml of dry pentane. The slurry was then stirred at room temperature for one hour.

With water bath cooling of the reaction flask, ethylene was added at 4 mmol/min for 30 min. The powder was collected and dried on a fritted glass funnel in a dry box. 4.37 g of prepolymerized catalyst was collected as a tan powder with several larger pieces of polymer from the flask walls. The catalyst was nominally 19 wt. % silica, 5.7 wt. % methylalumoxane, 0.25 wt. % zirconocene (0.057% Zr), and 75 wt. % polyethylene. Since the supported catalyst is only 25 wt. % of the prepolymerized catalyst, this is labeled PP(400)THIS in Table III, indicating that the catalyst was prepolymerized to 400% of its original weight and contained the tetrahydroindenyl zirconocene (THIZ).

Example 6

Synthesis of Prepolymerized Catalyst for Run C8 of Example 9

To 240 g of Davison 948 silica gel (dried at 800° C.) in a 2 gallon reactor equipped with a mechanical stirrer, was added 2500 ml of methylalumoxane in toluene (5.5 wt. % Al). The toluene was removed with sparging nitrogen while heating to 80° C. The reactor was cooled to 25° C. and the powder rinsed twice with 2 liters of dry isopentane, decanting to the top of the settled slurry after each rinse. Four liters of isopentane was then added to slurry the powder, and a solution of 5.0 g of bis(tetrahydroindenyl)zirconium dichloride in 300 ml of toluene was added over 10 minutes with vigorous stirring. Ethylene was added to the stirring slurry for 1.5 hours while the temperature was controlled to below 30° C. The slurry was allowed to settle and was transferred to the dry box where it was dried on a filter and stored under nitrogen. 941 g of tan powder was collected which was nominally 24 wt. % silica, 6.9 wt. % methylalumoxane, 0.50 wt. % zirconocene (0.12 wt. % Zr), and 67 wt. % polyethylene. Since the supported catalyst is only 33 wt. % of the prepolymerized catalyst, this is labeled PP(300)THIZ in Table III, indicating that the catalyst was prepolymerized to 300% of it original weight and contained the tetrahydroindenyl zirconocene.

Example 7

Synthesis of Prepolymerized . Catalyst for Run C11 of Example 10

To 10 g of Davison 948 silica gel (dried at 800° C. for 4 hours) in a 500 ml flask equipped with a magnetic stir bar, was added 200 ml of MAO in toluene (from Ethyl Corporation, reported 1 M in aluminum). The toluene was removed under vacuum, after heating at 80° C. for 1 hour. To 2 g of the solid residue, magnetically stirred under nitrogen in 35 ml of dry pentane, was added 40 mg of dimethylsilanylene-bis(tetrahydroindenyl)zirconium dichloride (STHI) dissolved in 3 ml of dry toluene. The slurry was then stirred at room temperature for 15 minutes.

With water bath cooling of the reaction flask, ethylene was added at 6 mmol/min. for 30 minutes. The powder was then collected on a fritted glass funnel in the dry box, washed three times with 30 ml of dry pentane, and dried. Collected was 6.17 g of prepolymerized catalyst as a tan powder with several larger pieces of polymer from the flask walls. The catalyst was nominally 12 wt. % methylalumoxane, 0.65 wt. % zirconocene (0.13 wt. % Zr), and 67 wt. % % polyethylene. Since the catalyst was prepolymerized to 308% of its original weight, this is labeled PP(308)STHI in Table III.

POLYMERIZATION EXAMPLE

Example 8

Standard Nonsupported Catalyst Polymerization: Procedure A

A clean, dry one liter autoclave was flushed with propylene and a measured quantity of MAO in toluene (Ethyl Corporation, reported as 1M in aluminum) was added by syringe. The reactor was then charged with 500 ml of liquid propylene and brought to the temperature for reaction, where the pressure in the autoclave was measured. The pressure in the reactor was then increased by a measured incremental pressure by addition of ethylene. To start the run, a measured quantity of the zirconocene dissolved in 3 ml of toluene was injected into the autoclave. Ethylene was supplied to maintain the initial total pressure in the autoclave. After reaction for the desired length of time, the monomers were flashed off, and the temperature brought to 25° C. The polymer product was recovered from the reactor and dried in a vacuum oven at 50° C. overnight. Amounts and types of catalysts used and the results of the polymerizations are reported in Table I.

Example 9

Standard Supported Catalyst Polymerization: Procedure B

The same procedure of Example 8 was followed except that the supported catalyst was injected as a slurry in 3 ml of hexane. Catalyst compositions, quantities of catalyst and of cocatalyst, temperatures and ethylene pressures for the runs are given in Table 11. cl Example 10

Standard Prepolymerized Catalyst Polymerization: Procedure C

The same procedure of Example 9 was followed, except that no alumoxane cocatalyst was used. Instead, TEAL was used as a scavenger for the polymerization, and the alumoxane incorporated in the prepolymerized catalyst provided the only cocatalyst. Details of the examples using prepolymerized catalysts are given in Table III.

Table I illustrates the effects of zirconocene structure on activity and product properties for a series of runs under similar conditions. Active catalysts cause strong exotherms at the initiation of the reaction. The polymer products invariably foul the reactor internal surfaces when using nonsupported catalysts. The combination of fouling and initial exotherm makes these runs difficult to control, causes broadening of the molecular weight distribution, lowers the molecular weight of the products, and makes reproducibility difficult.

Nonetheless, the runs in Table I show that most of the zirconocenes with structures according to the invention (A10–A16) are more active and provide higher molecular weight products than runs with the comparative catalysts (A1–A9). The apparent exceptions are with the comparative catalyst of runs A7 to A9, which is not in accord with the structures claimed, but still provided good molecular weight product at a reasonable activity in run A7. However, this molecular weight is obtained only at the expense of very high ethylene contents. At lower ethylene content, this catalyst gave lower molecular weights as shown by runs A8 and A9. The catalysts used in runs A11–A14 are clearly the most active and provide high molecular weight elastomers over a broad range of ethylene content.

Runs A14–A16 show that replacement of chloride by phenyl, trimethylsilylmethyl or an oxygen bridge to a second zirconocene has little effect on the activity or molecular weight of the products.

Table II compares the behavior of supported catalysts prepared from two of the most active zirconocenes of this invention with that of a catalyst prepared from one of the best comparative zirconocenes. The comparative catalyst employed in runs B1–3 show that high activity and high molecular weight are not simultaneously obtained; this is especially true for lower ethylene contents. The comparative catalyst of runs B1–B3 gave much lower molecular weight products at lower than 70 wt. % ethylene. This problem is eliminated with the catalysts of this invention. Although good quality EPC may be obtained with the catalysts employed in this invention even in the absence of additional alumoxane added to the slurry (run B11), the activity is dramatically lower. To obtain high activity, it was required to add additional MAO. In all of these runs, the products fouled the reactor as did the nonsupported catalysts. Broader MWDs are also noted where initiation exotherms cause high temperatures. Although the activity of the supported catalysts is somewhat reduced on a g-Zr basis from that of the nonsupported catalysts, the activity on a g-cat basis is well above the 1000 g/g-cat/h desirable for a commercial process.

Table III illustrates the improved performance obtained with the prepolymerized form of the supported catalysts. For these catalysts, the initiation exotherm was virtually undetectable in spite of the excellent high activities obtained. Furthermore, in contrast to the fouling invariably obtained with the catalysts in Tables I and 11, these catalysts did not foul the reactor, and in most cases the particulate product was comprised of individual spherical particles of polymer. This is a significant advantage for slurry polymerization with this type of catalyst.

TABLE I

Propylene Slurry Polymerizations Using Unsupported Catalysts (Example 8)

| Run | Zirconocene | Exotherm °C. | Yield g | Activity Kg/g-Zr/h | Ethylene wt % | Mw $10^3$ | MWD | ML 1 + 8, 127° C. |
|---|---|---|---|---|---|---|---|---|
| | | | | Comparative example: | | | | |
| A1 | $Me_2C(Cp)_2ZrCl_2$ | 1 | 7 | 105 | 70 | 172 | — | — |
| A2 | $Me_2Si(Cp)_2ZrCl_2$ | 1 | 18 | 281 | 38 | 37 | — | — |
| A3 | $(BenzylCp)_2ZrCl_2$ | 1 | 12 | 254 | 66 | 113 | — | — |
| A4 | $Me_2Si(MeCp)_2ZrCl_2$ | 1 | 33 | 553 | 44 | 72 | — | — |
| A5 | $Et(Ind)_2ZrCl_2$ | 13 | 36 | 668 | 41 | 49 | 2.3 | — |
| A6 | $Me_2Si(Ind)_2ZrCl_2$ | 15 | 36 | 707 | 36 | 51 | 2.7 | — |
| A7 | $(n-BuCp)_2ZrCl_2$ | 10 | 64 | 1137 | 83 | 249 | 2.6 | 67 |
| A8[a] | $(n-BuCp)_2ZrCl_2$ | 1 | 29 | 656 | 68 | 126 | 2.0 | 17 |
| A9[b] | $(n-BuCp)_2ZrCl_2$ | 1 | 36 | 322 | 54 | 66 | 2.5 | — |
| | | | | Invention examples: | | | | |
| A10 | $(n-BuTHI)_2ZrCl_2$ | 4 | 59 | 1330 | 79 | 209 | 2.9 | 61 |
| A11[c] | $(THI)_2ZrCl_2$ | 12 | 47 | 3300 | 83 | 390 | 3.6 | 54 |
| A12[d] | $Et(THI)_2ZrCl_2$ | 24 | 73 | 2740 | 50 | 281 | 3.4 | 86 |
| A13 | $Me_2Si(THI)_2ZrCl_2$ | 16 | 113 | 2260 | 40 | 265 | 10.6 | 52 |
| A14 | $(THI)_2ZrPh_2$ | 25 | 116 | 2460 | 76 | 218 | 7.3 | 73 |
| A15 | $(THI)_2Zr(TMSM)_2$ | 8 | 80 | 1770 | 84 | — | — | — |
| A16 | $[(THI)_2ZrCl]_2O$ | 20 | 103 | 1690 | 75 | — | — | — |

NOTE: unless otherwise specified, used 0.5 mg zirconocene, 4 mL of methylalumoxane (1 M in Al), 50° C., 500 mL propylene, 150 psi differential pressure of ethylene, 30 min run.
[a]Used 0.4 mg zirconocene, 8 mL of Methylalumoxane (0.8 M in Al), 100 psi of ethylene.
[b]Used 4 mL of methylalumoxane (0.8 M in Al), 50 psi of ethylene, 60 minute run.
[c]Used 0.13 mg zirconocene.
[d]Used 0.25 mg zirconocene and 2 mL of methylalumoxane.

TABLE II

Propylene Slurry Polymerizations Using Supported Catalysts (Example 9)

| Run | Zirconocene | Catalyst Zirc | Catalyst MAO | MAO mg | MAO ml | $C_2$ psi | T °C | ΔT °C | Yield g | Activity Kg/g-Zr/h | Activity Kg/g-cat/h | $C_2$ wt % | $M_w$ $10^3$ | MWD | ML 1 + 8, 127° C. |
|---|---|---|---|---|---|---|---|---|---|---|---|---|---|---|---|
| | | | | | | | | Comparative examples: | | | | | | | |
| B1 | (n-BuCp)$_2$ZrCl$_2$ | 2.3% | 7% | 20 | 6 | 100 | 50 | 1 | 14 | 240 | 1.4 | 71 | 125 | 2.1 | — |
| B2 | (n-BuCp)$_2$ZrCl$_2$ | 2.3% | 7% | 20 | 6 | 125 | 65 | 0 | 13 | 220 | 1.3 | 74 | 99 | 2.4 | — |
| B3 | (n-BuCp)$_2$ZrCl$_2$ | 2.3% | 7% | 20 | 6 | 125 | 35 | 1 | 6 | 100 | 0.6 | 84 | 351 | 2.4 | — |
| | | | | | | | | Invention examples: | | | | | | | |
| B4 | (THI)$_2$ZrCl$_2$ | 4.8% | 11% | 10 | 1 | 150 | 50 | 14 | 56 | 1020 | 11.1 | 76 | — | — | 52 |
| B5 | (THI)$_2$ZrCl$_2$ | 4.8% | 11% | 10 | 1 | 150 | 35 | 16 | 39 | 710 | 7.8 | 80 | 700 | 6.4 | no melt |
| B6 | (THI)$_2$ZrCl$_2$ | 4.8% | 11% | 10 | 1 | 80 | 50 | 10 | 77 | 1410 | 15.4 | 63 | 161 | 6.0 | 40 |
| B7 | (THI)$_2$ZrCl$_2$ | 4.8% | 9% | 10 | 5 | 100 | 50 | 14 | 111 | 2030 | 22.2 | 58 | 182 | 7.0 | 27 |
| B8 | (THI)$_2$ZrCl$_2$ | 4.8% | 9% | 10 | 2 | 100 | 50 | 10 | 83 | 1520 | 16.6 | 69 | — | — | 37 |
| B9 | (THI)$_2$ZrPh$_2$ | 4.2% | 16% | 5 | 1 | 150 | 50 | 2 | 22 | 1120 | 8.9 | 83 | 224 | 2.8 | — |
| B10 | (THI)$_2$ZrPh$_2$ | 4.2% | 16% | 5 | a | 100 | 50 | 2 | 25 | 1250 | 9.9 | 76 | 318 | 3.2 | 98 |
| B11 | (THI)$_2$ZrPh$_2$ | 4.2% | 16% | 50 | 1 | 150 | 50 | 1 | 27 | 140 | 1.1 | 79 | 193 | 3.2 | — |
| B12 | (THI)$_2$ZrPh$_2$ | 4.2% | 16% | 5 | 2 | 100 | 50 | 16 | 19 | 930 | 7.4 | 72 | 456 | 5.3 | 109 |
| B13 | Et(THI)$_2$ZrCl$_2$ | 2.4% | 11% | 50 | 1 | 150 | 50 | 10 | 98 | 760 | 3.9 | 61 | 315 | 3.8 | 83 |
| B14 | Me$_2$Si(THI)$_2$ZrCl$_2$ | 2.4% | 11% | 50 | 1 | 150 | 50 | 1 | 56 | 240 | 2.4 | 46 | — | — | — |
| B15 | Me$_2$Si(THI)$_2$ZrCl$_2$ | 2.4% | 11% | 10 | 1 | 150 | 50 | 1 | 20 | 400 | 4.0 | 45 | — | — | — |
| B16 | Me$_2$Si(THI)$_2$ZrCl$_2$ | 2.4% | 11% | 10 | b | 250 | 50 | 1 | 19 | 380 | 3.8 | 57 | 255 | 2.3 | — |
| B17 | Me$_2$Si(THI)$_2$ZrCl$_2$ | 2.4% | 11% | 10 | b | 250 | 40 | 1 | 19 | 380 | 3.8 | 60 | 388 | 2.5 | — |

NOTE: used 500 mL propylene, 30 min run.
$^a$Used 0.3 mL of 25% TEAL in hexane.
$^b$Used 1 mL of methylalumoxane and 1 mL of 25% TEAL in hexane.

TABLE III

Propylene Slurry Polymerizations Using Prepolymerized Catalyst (Example 10)

| Run | Catalyst | Catalyst Zirc | Catalyst MAO | Catalyst mg | 25% TEAL ml | $C_2$ psi | T °C. | ΔT °C. | Yield g | Activity Kg/g-Zr/h | Activity Kg/g-cat/h | $C_2$ wt % | $M_w$ $10^3$ | MWD | ML 1 + 8, 127° C. |
|---|---|---|---|---|---|---|---|---|---|---|---|---|---|---|---|
| C1 | PP(200)THIZ | 0.60% | 13% | 195 | 0.1 | 150 | 50 | 0.5 | 37 | 280 | 0.380 | 77 | 310 | 3.3 | 100 |
| C2 | PP(300)THIZ | 0.32% | 7% | 300 | 0.1 | 125 | 50 | 0.5 | 46 | 420 | 0.304 | 74 | 273 | 3.4 | 107 |
| C3 | PP(400)THIZ | 0.24% | 6% | 450 | 0.1 | 150 | 50 | 2.5 | 154 | 1250 | 0.686 | 69 | 302 | 3.6 | 88 |
| C4 | PP(400)THIZ | 0.24% | 6% | 200 | 0.1 | 100 | 50 | 0.1 | 54 | 980 | 0.535 | 64 | 209 | 3.1 | 98 |
| C5[a] | PP(400)THIZ | 0.24% | 6% | 200 | 0.1 | 150 | 40 | 1.0 | 23 | 280 | 0.151 | 77 | 345 | 3.7 | 76 |
| C6 | PP(400)THIZ | 0.24% | 6% | 400 | 0.1 | 100 | 40 | 1.0 | 53 | 480 | 0.262 | 71 | 323 | 3.2 | 87 |
| C7 | PP(400)THIZ | 0.24% | 6% | 200 | 0.1 | 125 | 45 | 0.4 | 26 | 470 | 0.255 | 74 | 318 | 4.0 | 93 |
| C8[b] | PP(300)THIZ | 0.50% | 7% | 250 | 0.5 | 125 | 50 | — | 185 | 1290 | 1.480 | 76 | 300 | 2.8 | 107 |
| C9 | PP(277)THIZ | 0.72% | 13% | 200 | 0.1 | 125 | 50 | 1.0 | 57 | 350 | 0.574 | 75 | 362 | 2.7 | 81 |
| C10 | PP(277)THIZ | 0.72% | 13% | 200 | 0.1 | 125 | 50 | 1.9 | 98 | 600 | 0.979 | 72 | — | — | — |
| C11 | PP(308)STHI | 0.65% | 12% | 100 | 0.1 | 250 | 40 | 0.8 | 62 | 950 | 1.230 | 51 | 285 | 2.2 | 74 |
| C12 | PP(330)STHI | 0.61% | 11% | 100 | 0.1 | 250 | 40 | 0.5 | 58 | 940 | 1.150 | 53 | 302 | 2.2 | 98 |
| C13 | PP(308)STHI | 0.65% | 12% | 100 | 0.1 | 400 | 40 | 0.5 | 61 | 940 | 1.220 | 66 | 325 | 2.7 | 109 |

NOTE: unless otherwise noted, used 500 mL propylene, 30 min run.
[a]45 min run.
[b]Two liter autoclave with 1250 ml propylene.

| Run | Zirconocene Catalyst Component |
|---|---|
| A1 | dimethylmethylene bridged bis(cyclopentadienyl) zirconium dichloride |
| A2 | dimethylsilanylene bridged bis(cyclopentadienyl) zirconium dichloride |
| A3 | bis(benzylcyclopentadienyl) zirconium dichloride |
| A4 | dimethylsilanylene bridged bis(methylcyclopentadienyl) zirconium dichloride |
| A5 | ethylene bridged bis(indenyl) zirconium dichloride |
| A6 | dimethylsilanylene bridged bis(indenyl) zirconium dichloride |
| A7–A9 | bis(n-butylcyclopentadienyl) zirconium dichloride |
| A10 | bis(n-butyl tetrahydroindenyl) zirconium dichloride |
| A11 | bis(tetrahydroindenyl) zirconium dichloride |
| A12 | ethylene bridged bis(tetrahydroindenyl) zirconium dichloride |
| A13 | dimethylsilanylene bridged bis(tetrahydroindenyl) zirconium dichloride |
| A14 | bis(tetrahydroindenyl) zirconium diphenyl |
| A15 | bis(tetrahydroindenyl) zirconium bis(trimethylsilylmethyl) |
| A16 | bis[bis(tetrahydroindenyl) zirconium chloride] oxide |
| B1–B3 | bis(n-butylcyclopentadienyl) zirconium dichloride |
| B4–B8 | bis(tetrahydroindenyl) zirconium dichloride |
| B9–B12 | bis(tetrahydroindenyl) zirconium diphenyl |
| B13 | ethylene bridged bis(tetrahydroindenyl) zirconium dichloride |
| B1–B17 | dimethylsilanylene bridged bis(tetrahydroindenyl) zirconium dichloride |
| C1–C10 | bis(tetrahydroindenyl) zirconium dichloride |
| C11–C13 | dimethylsilanylene bridged bis(tetrahydroindenyl)zirconium dichloride |

Definitions for Tables

| | |
|---|---|
| Zirconocene: | formula of the zirconocene component of the catalyst |
| Catalyst: | PP(nnn)THIZ is a $(THI)_2ZrCl_2$ containing catalyst prepolymerized with ethylene to nnn % of its nonprepolymerized weight, and PP(nnn)STHI is the same but containing $Me_2Si(THI)_2ZrCl_2$. |
| Catalyst Zirc: | wt % zirconocene in the supported or prepolymerized catalyst |
| MAO: | wt % methylalumoxane in the supported or prepolymerized catalyst |
| mg: | weight of catalyst used in the run |
| MAO ml: | quantity of methylalumoxane (1 M in toluene) added as cocatalyst to the liquid phase of the slurry |
| 25% TEAL ml: | quantity of triethylaluminum (25 wt % in hexane) used as a scavenger cocatalyst |
| $C_2$ psi: | incremental pressure of ethylene, above the vapor pressure of propylene, used for the run |
| T °C.: | reaction temperature |
| Exotherm °C.: | magnitude of the temperature exotherm observed upon injection of catalyst |
| ΔT °C.: | magnitude of the temperature exotherm observed upon injection of catalyst |
| Yield g: | weight of polymer, after drying, recovered from the reaction |
| Activity Kg/g-Zr/h: | Kg of polymer obtained per gram of zirconium per hour of reaction |
| Activity Kg/g-cat/h: | Kg of polymer obtained per gram of catalyst per hour of reaction |
| $C_2$ wt %: | weight % ethylene in the polymer product as per ASTM D3900 |
| $M_w$ $10^3$: | weight average molecular weight of the product as determined from DRI (in thousands) |
| MWD: | molecular weight distribution as expressed by the ratio of the weight average to number average molecular weights |
| $ML_{1+8}$, 127° C.: | Mooney viscosity as per ASTM D1646 |

I claim:

1. A prepolymerized catalyst for producing EPC elastomers in liquid olefin slurry polymerization, comprising:

an inorganic support which has been dried and treated with an alumoxane followed by addition of zirconocene of structure:

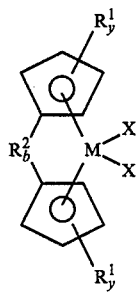

wherein each $R^1$ independently is a $C_1$–$C_{20}$ linear, branched or cyclic alkyl group or a $C_2$–$C_4$ cyclic alkylene group which forms a fused ring system group; $R^2$ is a $C_1$–$C_6$ linear, branched or cyclic alkylene, a $Si_1$–$Si_2$ alkyl substituted silanylene group or an alkyl substituted silaalkylene group; each X independently is a halide, hydride, an oxygen bridge of a zirconocene dimer, or a hydrocarbyl radical; "y" is a number 2, 3, or 4, and "b" is either 0 or 1;

followed by a prepolymerization treatment with ethylene or an α-olefin to increase the weight of the catalyst by at least 50 wt. %.

2. The prepolymerized catalyst of claim 1 wherein the inorganic support is a silica gel dried at 100° to 1000° C.

3. The prepolymerized catalyst of claim 2 wherein the alumoxane is methylalumoxane and the ratio with the silica gel is in the range of 1:1 to 1:10 on a weight basis.

4. The prepolymerized catalyst of claim 3 wherein the mole ratio of aluminum to zirconium is in the range of 1 to 500.

5. The prepolymerized catalyst of claim 4 wherein the prepolymerization weight gain is in the range of 50 to 500 wt. %.

6. The prepolymerized catalyst of claim 5 wherein the zirconocene is bis(tetrahydroindenyl)zirconium dichloride.

7. The prepolymerized catalyst of claim 5 wherein the zirconocene is dimethylsilanylene-bis(tetrahydroindenyl) zirconium dichloride.

8. The prepolymerized catalyst of claim 5 wherein the zirconocene, is ethylene-bis(tetrahydroindenyl)zirconium dichloride.

9. The prepolymerized catalyst of claims 6, 7 or 8 wherein the prepolymerized catalyst is washed with a hydrocarbon following prepolymerization.

* * * * *